US010924910B1

(12) United States Patent
Fitzpatrick et al.

(10) Patent No.: US 10,924,910 B1
(45) Date of Patent: Feb. 16, 2021

(54) SYSTEM AND METHOD FOR UNIVERSAL EMERGENCY NOTIFICATION AND MANAGEMENT

(71) Applicants: Brian Fitzpatrick, New Orleans, LA (US); Henry Jeff Burkhardt, New Orleans, LA (US)

(72) Inventors: Brian Fitzpatrick, New Orleans, LA (US); Henry Jeff Burkhardt, New Orleans, LA (US)

( * ) Notice: Subject to any disclaimer, the term of this patent is extended or adjusted under 35 U.S.C. 154(b) by 0 days.

(21) Appl. No.: 16/723,199

(22) Filed: Dec. 20, 2019

Related U.S. Application Data

(63) Continuation of application No. 16/254,393, filed on Jan. 22, 2019, now Pat. No. 10,667,116, which is a continuation of application No. 15/699,194, filed on Sep. 8, 2017, now Pat. No. 10,187,776, which is a continuation of application No. 14/972,299, filed on Dec. 17, 2015, now Pat. No. 9,788,183.

(60) Provisional application No. 62/093,017, filed on Dec. 17, 2014.

(51) Int. Cl.
*H04W 4/90* (2018.01)
*H04W 4/06* (2009.01)
*H04W 68/02* (2009.01)
*H04W 76/50* (2018.01)

(52) U.S. Cl.
CPC ............... *H04W 4/90* (2018.02); *H04W 4/06* (2013.01); *H04W 68/02* (2013.01); *H04W 76/50* (2018.02)

(58) Field of Classification Search
CPC .......... H04W 4/90; H04W 4/06; H04W 68/02
See application file for complete search history.

(56) References Cited

U.S. PATENT DOCUMENTS

| 8,937,658 B2 * | 1/2015 | Hicks, III ........ G08B 13/19656 |
| | | 348/143 |
| 9,336,663 B1 * | 5/2016 | Cohen ..................... G08B 13/02 |
| 9,788,183 B1 | 10/2017 | Fitzpatrick et al. |
| 10,187,776 B1 | 1/2019 | Fitzpatrick et al. |
| 2003/0012344 A1 | 1/2003 | Agarwal et al. |
| 2007/0223509 A1 | 9/2007 | Chatterjee et al. |
| 2008/0015794 A1 * | 1/2008 | Eiler ........................ F24F 3/16 |
| | | 702/33 |

(Continued)

*Primary Examiner* — Jaime M Holliday
(74) *Attorney, Agent, or Firm* — Foley & Lardner LLP

(57) ABSTRACT

Systems and methods for triggering emergency mass notifications include an EMNS activation service, a plurality of activation premises devices, a plurality of EMNS provider services, and a plurality of event personnel devices. The EMNS activation service includes a universal translator module that receives an event trigger signal relating to an emergency event from one of the activation premises devices. The universal translator module translates the event trigger signal to event-specific EMNS protocols of the EMNS providers. The EMNS activation service communicates the event-specific EMNS protocols to the EMNS providers, and communicates event data to event personnel devices based on a list of event personnel devices to be notified of an emergency event. An activation premises device includes a housing event with trigger controls for creating the event trigger signal, wherein these event trigger controls are inaccessible to users in the absence of an authorized access or an emergency access.

19 Claims, 11 Drawing Sheets

(56) References Cited

U.S. PATENT DOCUMENTS

| | | | |
|---|---|---|---|
| 2009/0128323 A1* | 5/2009 | Milbar | H04H 20/59 340/539.1 |
| 2009/0247114 A1 | 10/2009 | Sennett et al. | |
| 2010/0277307 A1 | 11/2010 | Horton et al. | |
| 2014/0155018 A1* | 6/2014 | Fan | H04W 76/50 455/404.1 |
| 2016/0094967 A1 | 3/2016 | Sulaiman et al. | |

* cited by examiner

SYSTEM AND METHOD FOR UNIVERSAL EMERGENCY NOTIFICATION AND MANAGEMENT

CROSS-REFERENCE TO RELATED APPLICATION

The present application is a continuation of U.S. Ser. No. 16/254,393, entitled "SYSTEM AND METHOD FOR UNIVERSAL EMERGENCY NOTIFICATION AND MANAGEMENT," filed Jan. 22, 2019, which is a continuation of U.S. Ser. No. 15/699,194, entitled "SYSTEM AND METHOD FOR UNIVERSAL EMERGENCY NOTIFICATION AND MANAGEMENT," filed Sep. 8, 2017, now U.S. Pat. No. 10,187,776, issued Jan. 22, 2019, which is a continuation of U.S. Ser. No. 14/972,299, entitled "SYSTEM AND METHOD FOR UNIVERSAL EMERGENCY NOTIFICATION AND MANAGEMENT," filed Dec. 17, 2015, now U.S. Pat. No. 9,788,183, issued Oct. 10, 2017, which claims benefit of U.S. Provisional Application No. 62/093,017 filed Dec. 17, 2014, entitled "SYSTEM AND METHOD FOR UNIVERSAL EMERGENCY NOTIFICATION AND MANAGEMENT," all of which are hereby incorporated by reference in their entirety.

TECHNICAL FIELD OF DISCLOSURE

The present invention relates generally to emergency notification and management, and more particularly to emergency mass notification systems and methods.

BACKGROUND

Emergency mass notification system (EMNS) providers distribute succinct information to masses of individuals during an emergency event. Recently, EMNS providers have focused on broad functionality and have turned to computer interfaces for the activation of their products due to the wide range of alerts needed. While the ease of networked communication allows more rapid information dissemination, there are complexities due to the different protocols required by communication infrastructure and networks. Therefore, selecting the most appropriate message to disseminate can take considerable time.

Many emergency managers utilize multiple services to provide the scope of notifications that they deem necessary. For example, one service might send out text messages (SMS), another would create pop-up messages on computer workstations, and a third might initiate audible announcements across a large campus, both indoor and outdoor. Other services may turn on reader board displays, scroll text across the bottom of TV's, make phone calls to subscribers, send emails, call phones, lock down buildings, etc.

The time required to get to an emergency manager's workstation, log on, open the emergency notification application, authenticate the user, find the correct message, and initiate the message is considerable. Doing this for each notification system adds additional time to this process, and is dependent upon each service and system being available and functioning correctly. In current systems, the time necessary to complete the activation of notifications allows for additional damage and loss of life.

Another issue, typically overlooked, as it does not emerge in EMNS system tests, is the immediate overload of most communications systems in the area during actual emergencies. Persons receiving EMNS alerts immediately attempt to contact someone (parent, boss, local authority, etc.). Cellular systems, PBX systems, telco switches, SMS carriers all go into overload. Two way radio systems become over-active and depend on push to talk (PTT) protocols requiring clear air to initiate a message. Critical communications relevant to emergency management cannot get through. Cellular providers do provide priority queuing to registered emergency managers, but this does not resolve all of the issues.

SUMMARY

Disclosed herein are systems and methods for emergency mass notification, herein sometimes referred to as "Emergency Mass Notification Systems" or "EMNS." In an embodiment, the present systems and methods combine the simplicity of a mechanical device, suitable for signaling under duress, with simplified network communication for triggering multiple EMNS providers. It is generally done by having one or more devices located at a facility, that allow an activation premises to activate an event trigger. The event trigger is not in itself an emergency mass notification, but activates a process for EMNS notifications via EMNS providers. The devices have push button functionality that are in operable connection to an EMNS activation service, where the EMNS activation service comprises a universal translator program that translates the event-specific messages from the customer to the appropriate protocols required by one or more EMNS provider. In an embodiment, the EMNS activation services maintains data on event personnel to be notified of event data based on an activated event trigger, wherein such notifications are communicated to the event personnel by one or more of the EMNS providers, not by the EMNS activation service. In parallel with the notification communications of event data based on the activated event trigger, the EMNS activation service provides conferencing services to initiate a collaboration call including designated emergency managers and the party that activated the device for triggering an event.

In one embodiment, an event trigger can be activated with a mechanical device including a push button interface with a series of activation buttons. In another embodiment, the activation buttons of a mechanical device for activating an event trigger can be emulated in a smartphone EMNS activation app, in which the app may provide an alternative device for an emergency manager use of the service.

In another embodiment, the EMNS activation service may be capable of handling a variety of emergency management services and management functions. In one embodiment, the EMNS activation service may be used to initiate a telephone conference among emergency managers. In an embodiment, the EMNS activation service may be used to manage and update the chain of command for emergency management. In an embodiment the EMNS activation service may be used to disseminate emergency management protocols. In an embodiment, the EMNS activation service may be used for automated compliance reporting.

In an embodiment, a processor based method of providing a notification comprises receiving, by a processor communicatively coupled to a database, an event trigger signal transmitted by an activation premises device, the event trigger signal relating to an emergency event at an activation premises, wherein the database stores EMNS protocol information for a plurality of EMNS provider services, and a list of a plurality of event personnel devices associated with a plurality of event personnel to be notified of an emergency event; and wherein the activation premises device has a stationary location at the activation premises and is configured to accept a user input that initiates the event trigger signal in a predefined format, and to record local environmental information at the stationary location and include the local environmental information in the event trigger signal; translating, by the processor, the event trigger signal for each one of the plurality of EMNS provider services to event data in an event-specific EMNS protocol based upon the EMNS protocol information stored for that one of the plurality of EMNS providers; transmitting, by the processor, the event data in the event-specific EMNS protocol to each one of the plurality of EMNS provider services; and communicating, by the processor, data based upon the event trigger signal to at least one of the plurality of event personnel devices associated with the plurality of event personnel to be notified of an emergency event.

In an embodiment, a processor based method of providing a notification, comprises receiving, by a processor communicatively coupled to a database, an event trigger signal transmitted by an activation premises device, the event trigger signal relating to an emergency event, wherein the database stores EMNS protocol information for a plurality of EMNS provider services, and a list of a plurality of event personnel devices associated with a plurality of event personnel to be notified of an emergency event; and wherein the activation premises device is configured to provide the event trigger signal in a predefined format; translating, by the processor, the event trigger signal for each one of the plurality of EMNS provider services to event data in an event-specific EMNS protocol based upon the EMNS protocol information stored for that one of the plurality of EMNS providers; transmitting, by the processor, the event data in the event-specific EMNS protocol to each one of the plurality of EMNS provider services; communicating, by the processor, data based upon the event trigger signal to at least two of the plurality of event personnel devices associated with the plurality of event personnel to be notified of an emergency event; and initiating a collaboration conference call via communications with the activation premises device and via communications with the at least two of the plurality of event personnel devices.

In an embodiment, a system comprises an EMNS activation server configured with a computer-readable storage medium, communicatively coupled to a communication network, and including modules executable by a processor of the EMNS activation server, wherein the computer-readable storage medium is configured to store EMNS protocol information for a plurality of EMNS provider services and a list of a plurality of event personnel devices associated with a plurality of event personnel to be notified of an emergency event; the modules comprising: a universal translator module configured to receive an event trigger signal transmitted by an activation premises device, the event trigger signal relating to an emergency event; configured to translate the event trigger signal for each one of the plurality of EMNS provider services to event data in an event-specific EMNS protocol based upon the stored EMNS protocol information for that one of the plurality of EMNS providers; and a communication protocol module configured to communicate via the communication network to each one of the plurality of EMNS provider services the event data in the event-specific EMNS protocol, and configured to initiate a collaboration conference call via communications with the activation premises device and via communications with at least two of the plurality of event personnel devices In an embodiment, a processor based method of providing a notification comprises receiving, by a processor communicatively coupled to a database, an event trigger signal transmitted by an activation premises device, the event trigger signal relating to an emergency event, wherein the database stores EMNS protocol information for a plurality of EMNS provider services, and a list of a plurality of event personnel devices associated with a plurality of event personnel to be notified of an emergency event; and wherein the activation premises device is configured to provide the event trigger signal in a predefined format; translating, by the processor, the event trigger signal for each one of the plurality of EMNS provider services to event data in an event-specific EMNS protocol based upon the EMNS protocol information stored for that one of the plurality of EMNS providers; transmitting, by the processor, the event data in the event-specific EMNS protocol to each one of the plurality of EMNS provider services; and communicating, by the processor, data based upon the event trigger signal to at least one of the plurality of event personnel devices associated with the plurality of event personnel to be notified of an emergency event.

In another embodiment, a system comprises an EMNS activation server configured with a computer-readable storage medium, communicatively coupled to a communication network, and including modules executable by a processor of the EMNS activation server, wherein the computer-readable storage medium is configured to store EMNS protocol information for a plurality of EMNS provider services and a list of a plurality of event personnel devices associated with a plurality of event personnel to be notified of an emergency event; the modules comprising a universal translator module configured to receive an event trigger signal transmitted by an activation premises device, the event trigger signal relating to an emergency event; configured to translate the event trigger signal for each one of the plurality of EMNS provider services to event data in an event-specific EMNS protocol based upon the stored EMNS protocol information for that one of the plurality of EMNS providers; and a communication protocol module configured to communicate via the communication network to each one of the plurality of EMNS provider services the event data in the event-specific EMNS protocol.

In a further embodiment, an activation premises device comprises a housing; a plurality of event trigger controls for creating an event trigger signal, the event trigger signal relating to an emergency event, wherein the event trigger controls are inaccessible to users within the housing in the absence of actuation of an authorized access module or one or more emergency access control devices; a communication module communicatively coupled to the event trigger controls and a communication network for communicating the event trigger signal to an EMNS activation service over the communication network, wherein the event trigger signal is in a predefined format; the authorized access module for providing authorized access to the event trigger controls; and the one or more emergency access control devices associated with the housing for providing emergency access to the event trigger controls.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
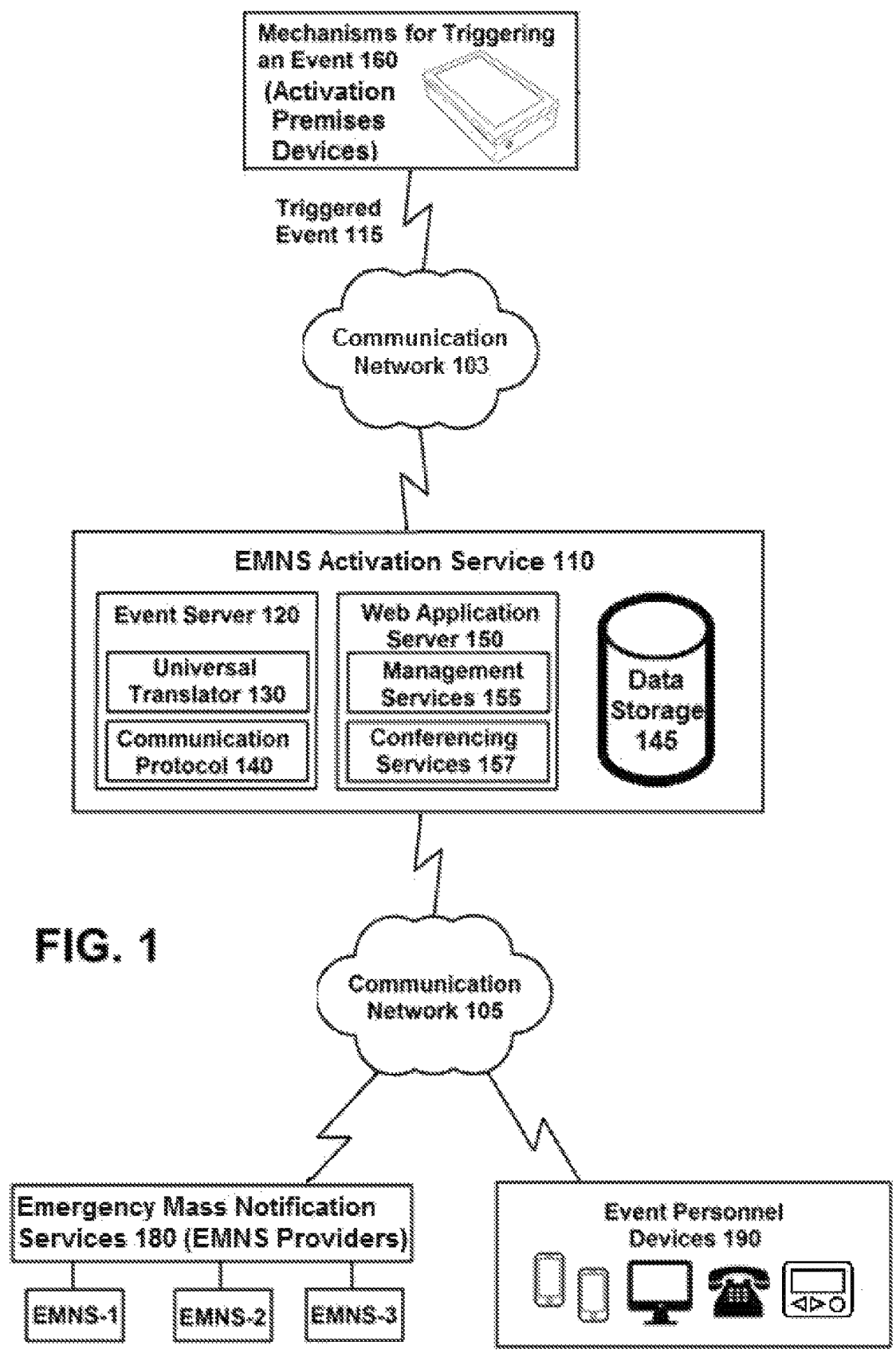
FIG. 1 is a functional block diagram illustrating a system architecture for an EMNS activation service, according to an embodiment.

The present disclosure is here described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Having reference to the system architecture diagram of FIG. 1, the embodiments described herein provide a system and method for processing a triggering event 115 (sometimes referred to herein as an "emergency event", or simply an "event"). The system and method features an EMNS activation service 110 that interacts over a communication network 103 including a plurality of mechanisms for triggering an event 160, also herein called activation premises devices 160. Additionally, EMNS activation service 110 interacts over a communication network 105 with a plurality of emergency mass notification services (EMNS providers) 180, and a plurality of event personnel devices 190. As used in the present disclosure, the term "EMNS" is an acronym for "emergency mass notification systems", which are entities, companies or groups that specialize in mass distribution of communications during emergencies. The terms "EMNS provider" and "EMNS provider services" are used to signify services for emergency mass notification (including computer hardware and software, and various input and output devices, utilized in such services). The term "event personnel devices" (and sometimes just "event personnel") is used in this disclosure to denote a plurality of devices associated with persons to be notified of a triggered emergency event, generally via EMNS notifications communicated by one or more of the EMNS providers 180. The EMNS activation service 110 provides an improved system of communication between the plurality of mechanisms for triggering an event 160, the plurality of EMNS provider services 180, and the plurality of event personnel devices 190. Exemplary event personnel devices shown in FIG. 1 include smartphones, display devices, telephones, and pagers. EMNS activation service 110 employs a universal translator 130 to translate event data associated with an emergency event 115 into event-specific EMNS protocols 148 for use by one or more EMNS provider 180 in emergency mass notification systems communications.

Figure 2:
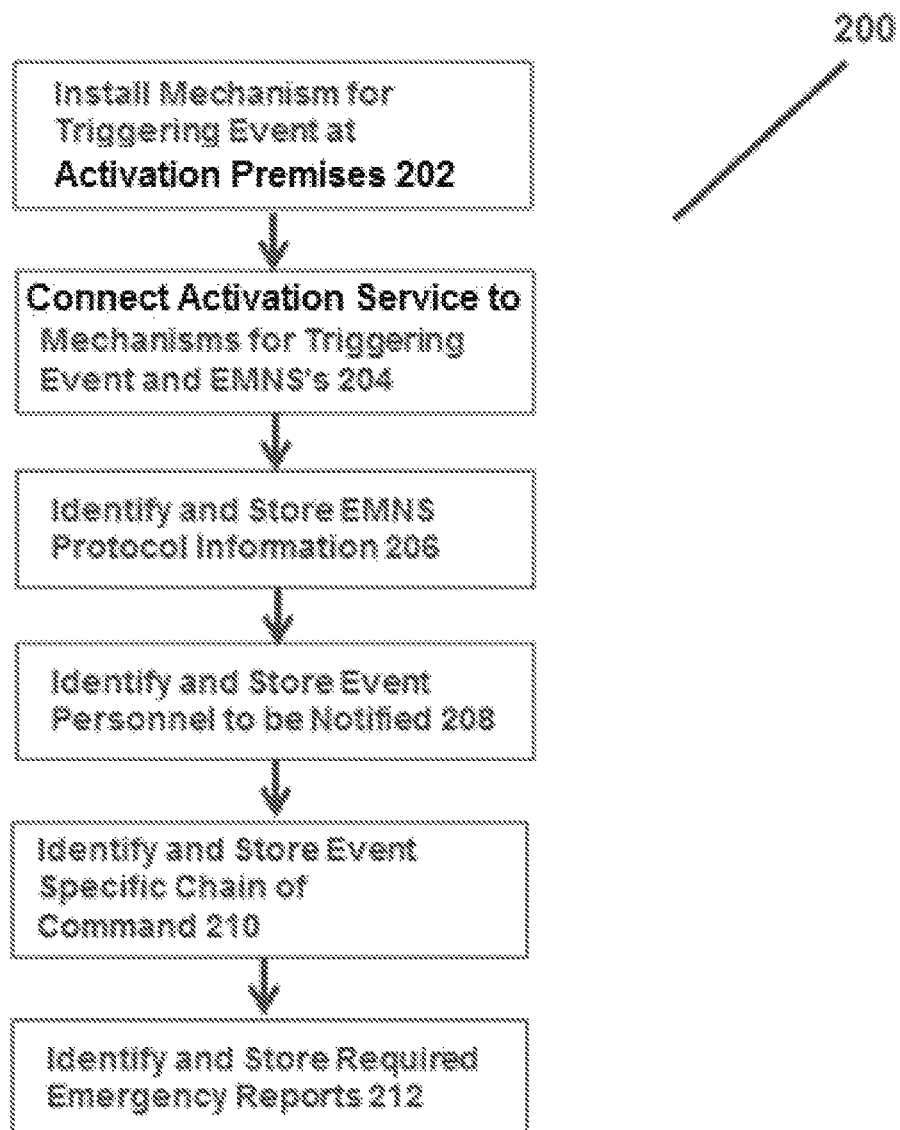
FIG. 2 is a flow diagram illustrating an exemplary method for setting up an EMNS activation service, according to an embodiment.

FIG. 2 shows various steps of a method 200 for setting up an EMNS activation service 110 in preparation for handling emergency events 115. In an embodiment, these preparatory steps involve setting up the EMNS activation service itself, and setting up other entities that may communicate with the EMNS activation service 110 should an emergency event 115 arise, such as customers of the EMNS activation service.

At step 202, the EMNS activation service, or a third party operating under the direction of the EMNS activation service, installs a mechanism for triggering event 160 at activation premises associated with the EMNS activation service 110. The term "activation premises" herein denotes the premises at which or by which a triggering event is activated. In some embodiment, the activation premises is a customer of the EMNS activation service 110. In an embodiment, the mechanisms for triggering event are set up to provide event trigger signals in a predefined format recognized by the universal translator. Step 204 involves setting up a universal translator 130 of the EMNS activation service, connecting the EMNS activation service with universal translator to a network including a plurality of mechanisms for triggering events, a plurality of EMNS providers, and a plurality of event personnel devices. Subsequent steps of method 200 are also part of setting up the EMNS activation service, but are shown separately as instances of acquiring and storing various data in setting up the universal translator. At step 206, the EMNS activation service acquires and stores EMNS protocol information for initiating notification of triggered events by an EMNS provider. At step 208, the EMNS activation service identifies and stores event personnel (i.e., event personnel devices) to receive event data upon occurrence of a triggered event. At step 210, the EMNS activation service identifies and stores a chain of command list that is event-specific. At step 212, the EMNS activation service identifies and stores required emergency reports that are needed upon occurrence of a triggered event). Following these set up steps, the EMNS activation service is prepared to handle communications during the triggering of an event.

Figure 3:
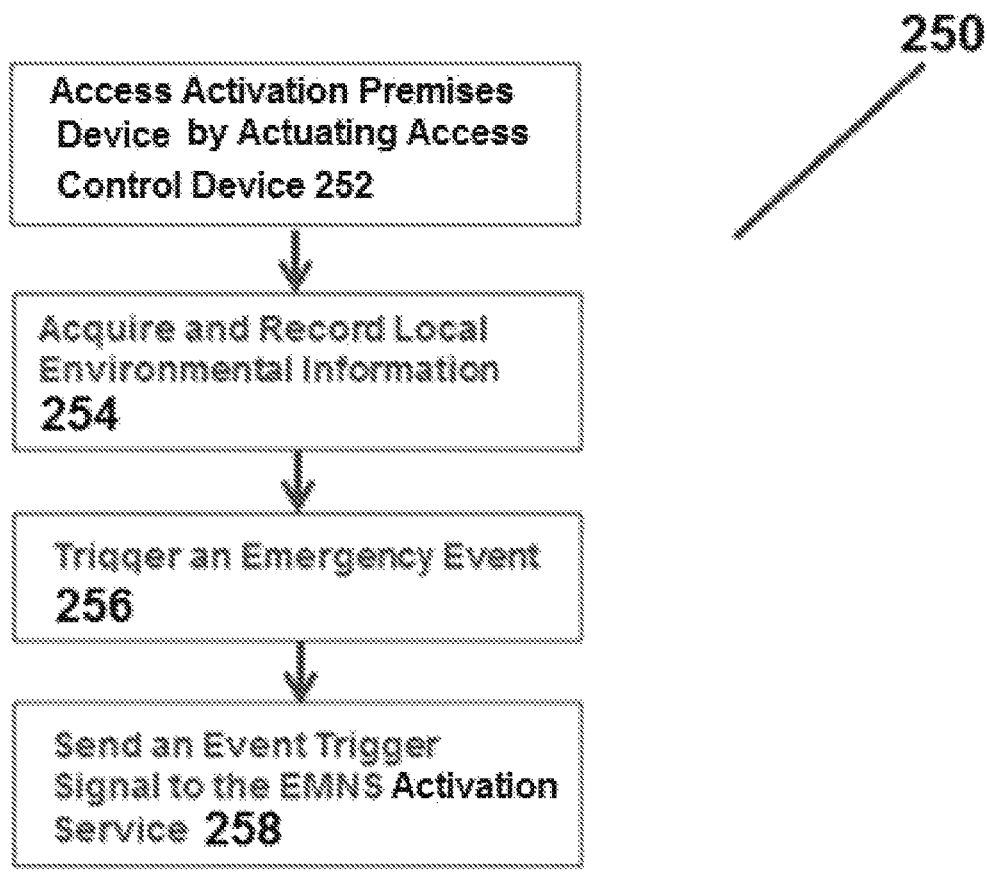
FIG. 3 is a flow diagram illustrating an exemplary method for handing communications during the triggering of an event, according to an embodiment.
Figure 7:
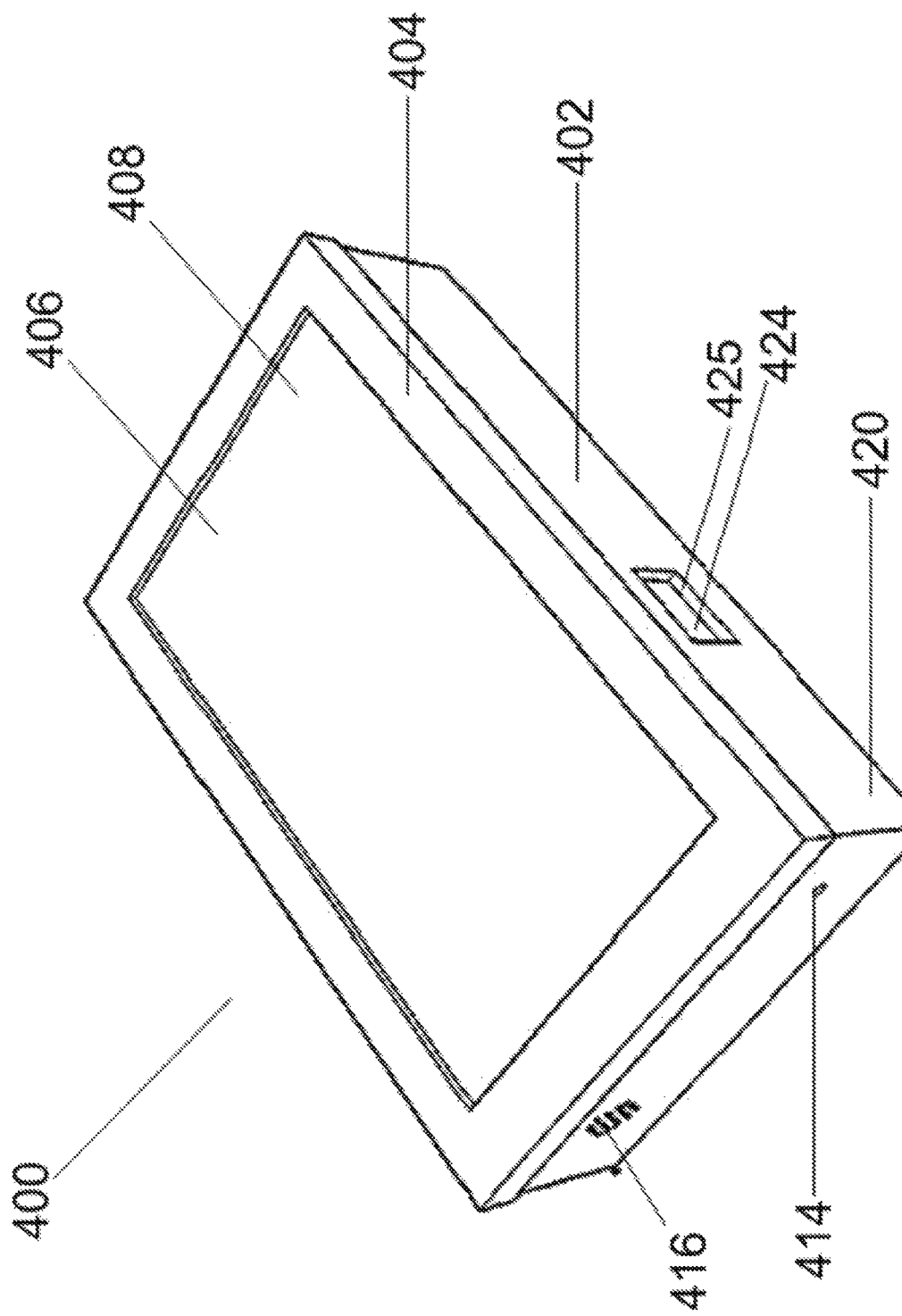
FIG. 7 is a perspective view of an enclosure access side panel side of an activation premises device, according to the embodiment of FIG. 6.
Figure 8:
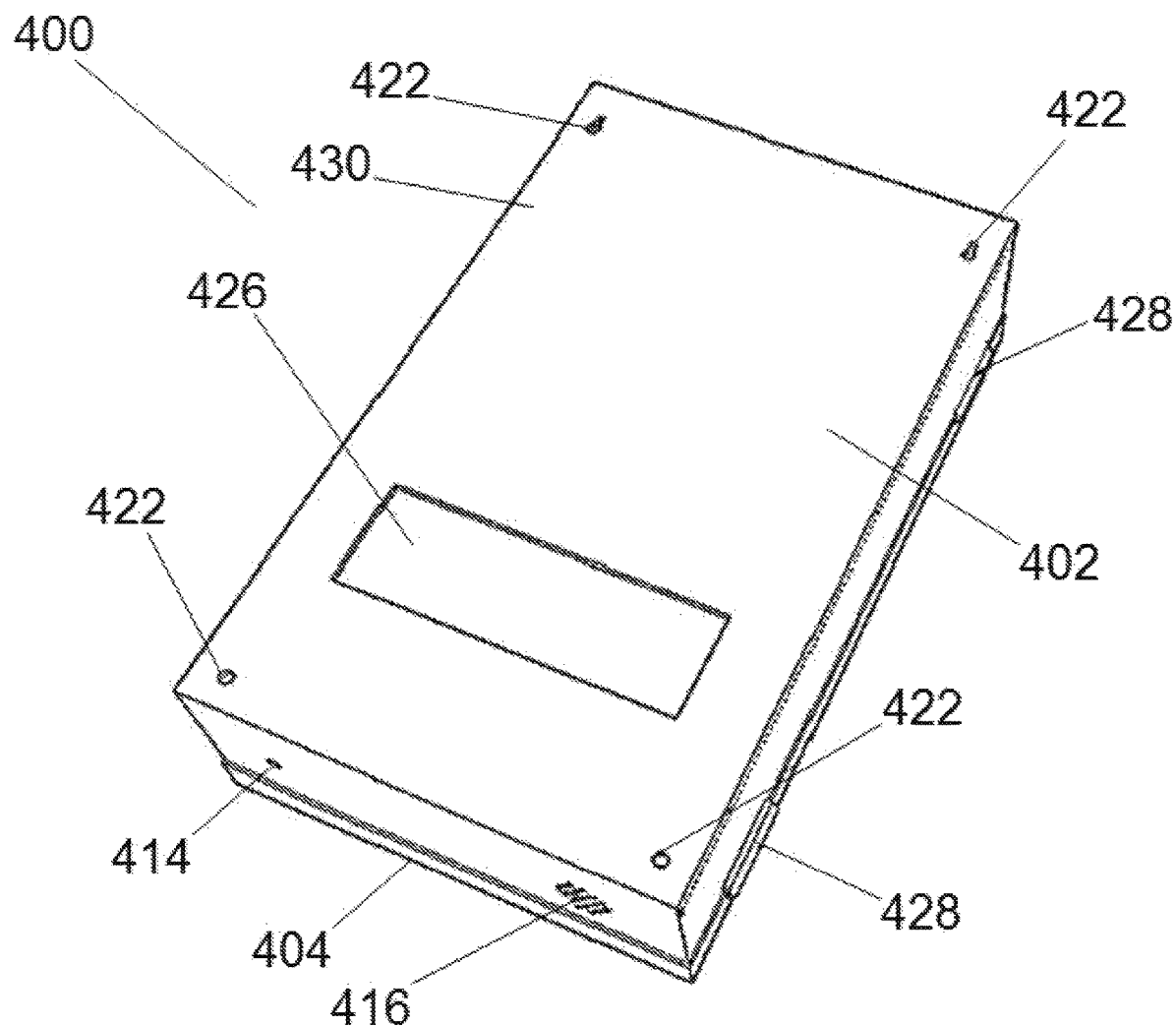
FIG. 8 is a rear perspective view of an activation premises device, according to the embodiment of FIG. 6.

FIG. 3 provides steps of a method 250 for handling communications during the triggering of an event, wherein the method steps are effected via an activation premises device or other mechanism for triggering an alert. Upon the occurrence of an event, the activation premises device, which is normally inaccessible to users, is accessed 252 via the access control device. Alternatively, if the access control device fails or is unavailable, the activation premises device may be accessed via emergency measures, such as breaking a glass panel or a mechanically actuated device such as a mechanism in an access hole. As used in the present patent disclosure, the access control device is sometimes referred to as an authorized access mechanism; whereas breaking of a glass panel access via a mechanically actuated device is sometimes referred to as an emergency access control device. Examples of these access mechanisms are disclosed below with reference to FIG. 7. At 254, the activation premises device acquires and records local environmental information. In an embodiment, step 254 is effected via one or more sensors on the activation premises device. In a further embodiment, at step 254 the activation premises device records an image of a person activating the device via a digital camera. At step 256, the activation premises device triggers an event. In an embodiment, step 256 is effected via a triggering event application on the CPU of the activation premises device. In an embodiment, following triggering an event at 256 the activation premises device displays a confirmation of activation. At step 258, upon triggering the event the activation premises device sends an event trigger signal to the EMNS activation service. In an embodiment of step 258, upon receipt of the event trigger signal, the EMNS activation service relays event data based upon the event trigger signal to one or more EMNS.

Figure 4:
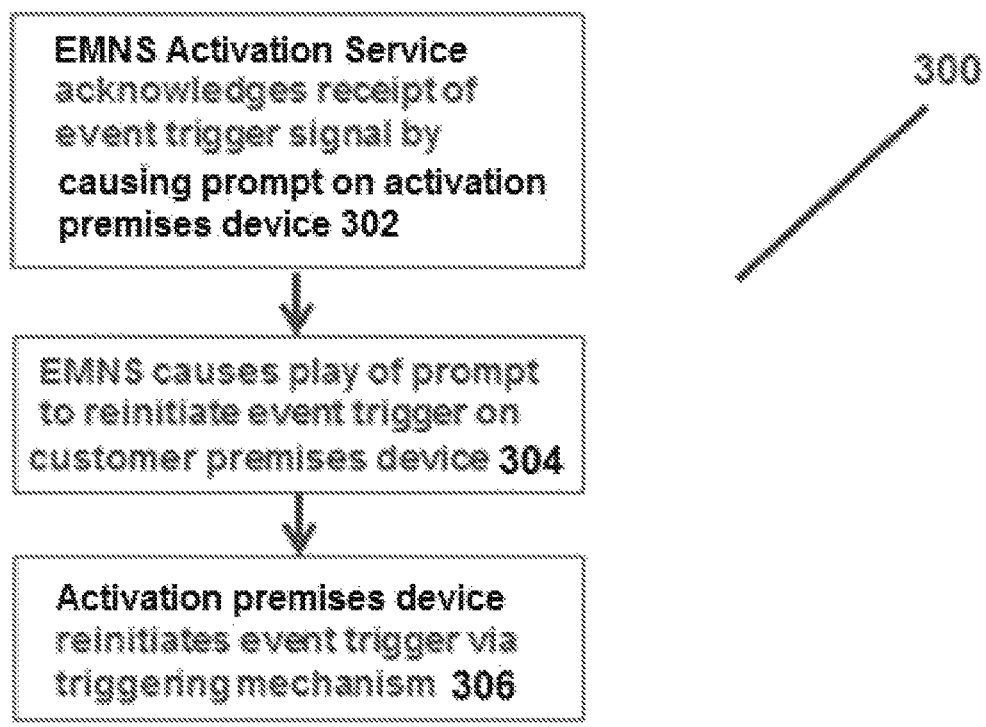
FIG. 4 is a flow diagram illustrating an exemplary method for confirming and reinitiating the triggering of an event, according to an embodiment.

FIG. 4 provides steps of a method 300 to confirm and reinitiate the triggering of an event, wherein the method steps are effected by the EMNS activation service when an activation premises device sends an event trigger signal to the EMNS activation service. At step 302, the EMNS activation service acknowledges the event trigger signal by transmitting to the activation premises device a signal (herein sometimes called an acknowledgement signal) causing an audio to be played by the activation premises device. In an alternative embodiment of step 302, the EMNS activation service acknowledges the event trigger signal by transmitting to the activation premises device an acknowledgement signal causing the display of an acknowledgement message on the touch screen of the activation premises device. In a further embodiment of step 302, the EMNS activation service acknowledges the event trigger signal by transmitting to the activation premises device an acknowledgement signal causing the display of a video on a display screen of the activation premises device. At step 304, the EMNS activation service transmits to the activation premises device a signal (herein sometimes called a reinitiation command) causing play of an audio prompt to reinitiate the event trigger. In an embodiment, the reinitiation prompt is generated by Activation Premises Device based upon a previously configured message. The reinitiation command serves as a safety procedure, requiring the activation premises to confirm its intent to activate an EMNS notification process by reinitiating the event trigger. In an alternative embodiment of step 304, the EMNS activation service transmits to the activation premises device a reinitiation command causing the display of a prompt to reinitiate the event trigger on the touch screen of the activation premises device. In an alternative embodiment of step 304, the EMNS activation service transmits to the activation premises device a reinitiation command causing the display of a video by the activation premises device with a prompt to reinitiate the event trigger. At step 306, the activation premises device reinitiates the event trigger via the triggering mechanism of the activation premises device.

Figure 5:
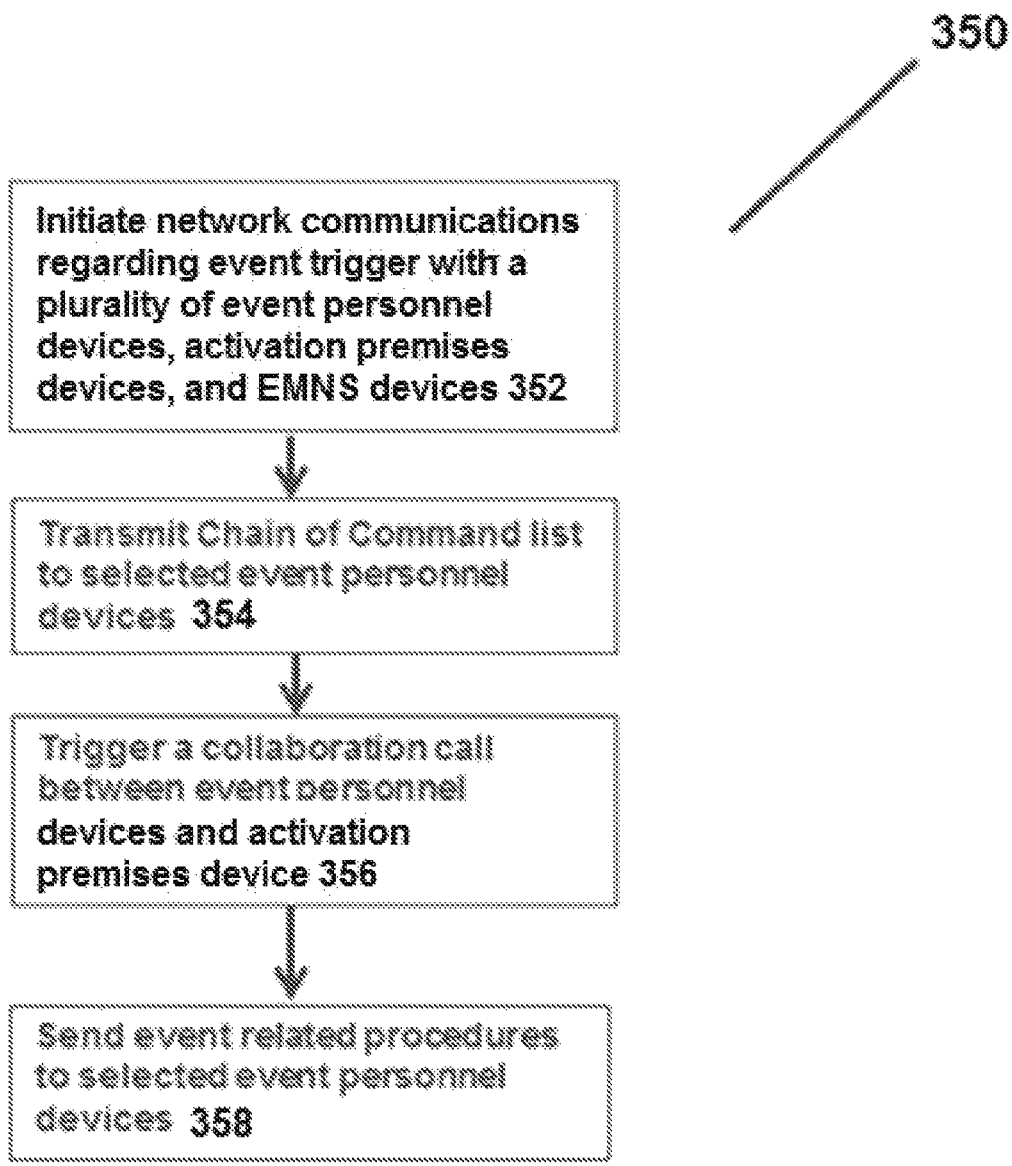
FIG. 5 is a flow diagram illustrating an exemplary method for relaying event data based upon an event trigger signal, according to an embodiment.
Figure 6:
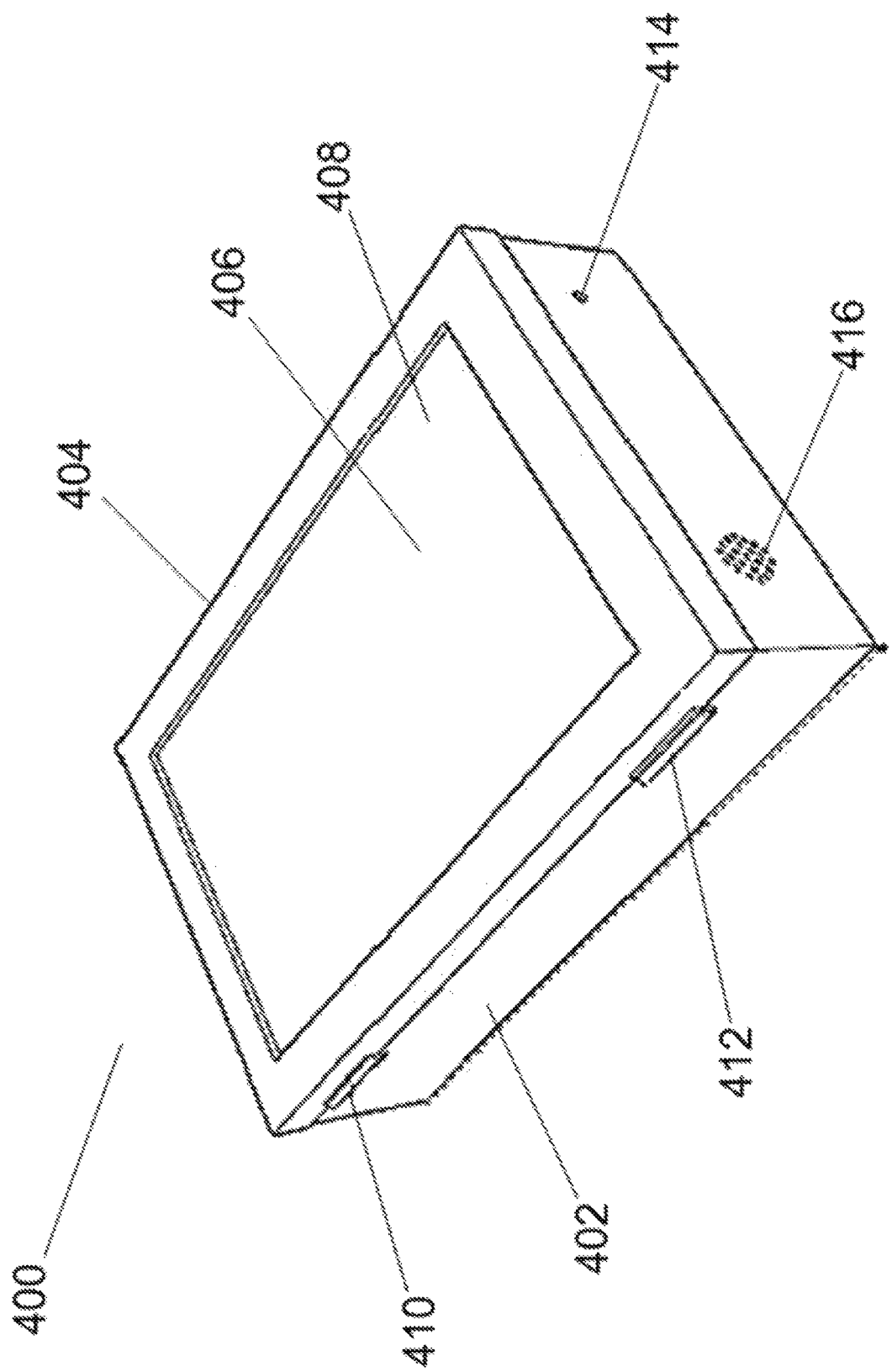
FIG. 6 is a front perspective view of a activation premises device with hinged access door, according to an embodiment.

FIG. 5 provides steps of a method 350 for handing communications as the EMNS activation service relays event data based upon the event trigger signal, wherein the method steps are effected by the EMNS activation service upon receipt of an event trigger signal by the EMNS activation service. At step 352, the EMNS activation service initiates network communications concerning the event trigger with a plurality of event personnel devices, with a plurality of activation premises devices, and with a plurality of EMNS provider.

In one embodiment of step 352, the EMNS activation service initiates network communications concerning the event trigger with a plurality of EMNS providers in parallel. In another embodiment of step 352, the EMNS activation service initiates network communications concerning the event trigger with a plurality of EMNS providers sequentially. In an embodiment, the EMNS activation service stores event-specific EMNS protocol information for each EMNS provider; and at step 352 the EMNS activation service translates the event trigger to an event notification based upon the EMNS protocol information stored for that EMNS provider, and transmits the event-specific event notifications based on this translation to a plurality of EMNS providers.

At step 354, the EMNS activation service transmits a chain of command list to event personnel devices. In an embodiment of step 354, the chain of command list is a prioritized list of event personnel stored by the universal translator. At step 356, the EMNS activation service triggers a collaboration call between the activation premises device and the event personnel devices. In an embodiment of step 356, the collaboration call is activated by the EMNS activation service during a triggered event and connects selected event personnel with one or more user of the activation premises device that triggered the event. Additionally, the collaboration call may include other pertinent individuals. At step 358, the EMNS activation service sends event related procedures to the selected event personnel.

It should be noted with reference to FIG. 1 that generally, communications of event data based upon the event trigger signal between the EMNS activation service 110 and the plurality of event personnel devices 190 are effected via EMNS providers 180. That is, EMNS activation service communicates event data based upon event trigger signals over communication network 105 to EMNS providers 180; and the EMNS providers in turn communicate with EMNS personnel devices over communication network 105 and via other channels of mass notification using EMNS services of the EMNS providers. However, in the case of collaboration calls between EMNS activation service 110 and event personnel devices 190, communications are direct and not through EMNS providers 180.

In the present EMNS activation service 110, a mechanism 160 for triggering an emergency event may activate a notification to an EMNS service 180 during the event. In one embodiment, the mechanism for triggering an emergency event is a dedicated activation premises device 400, as described below. In other embodiments, the mechanism 160 for triggering an emergency event is a smart phone application, a telephone style device, a touch screen interface (e.g., for a tablet computer), or other implementation via suitable hardware and/or software. As used in the present patent application, the term "activation premises device" includes both dedicated activation premises devices, and general computing devices that provide the functionality of dedicated activation premises devices, such as smart phone applications. The latter embodiments are not shown in the drawings, but include user interface features of the dedicated activation premises device 400, such as event trigger controls that emulate the front button insert panel 440 of FIG. 9. As an alternative to the term "activation premises device", which connotes a devices 160 at the premises of a customer of the EMNS activation service, an alternative term used in the present disclosure is "activation premises device", which connotes a device for triggering an event to be reported to the EMNS activation service.

It is also contemplated that the mechanism for triggering an emergency event may have other functions relating to emergency events such as to mediate lighting control, initiate group teleconferences among emergency managers, and allow for SCADA (Supervisory Control and Data Acquisition) system interface and remote control. As another example, the EMNS activation service may be used for automated compliance reporting, such as compliance reporting under The Jeanne Clery Disclosure of Campus Security Policy and Campus Crime Statistics, codified at 20 U.S.C. § 1092(f), commonly known as the Cleary Act. Further, the mechanism for triggering an emergency event may activate miscellaneous other emergency event measures appropriate to given facilities, such as petrochemical process control.

Referring to the embodiment of FIGS. 6-10, the exterior of activation premises device 400 includes two parts, an enclosure 402 and an enclosure door 404. Components of the enclosure 402 include an enclosure door 404, an enclosure back surface 430, an enclosure end panel including microphone perforations 414 and speaker perforations 416, and an enclosure opening side panel 420 including an access control device 425. In one embodiment, structural components of activation premises device 404 are chiefly made up of aluminum. In other embodiments, structural components of activation premises device 404 may be made of wood, engineering plastic, steel, or combinations of these materials. Interior components of the activation premises device 400 include an insert front panel 440 (FIG. 9) that is accessible by opening enclosure door 404. In addition, as discussed below with reference to FIG. 10, the activation premises device 400 contains a mainboard 460 (FIG. 10) that includes various power elements, control elements, and other functional elements.

At the front surface 410 of the enclosure 402 (FIG. 6), the enclosure door 404 provides access to interior components of activation premises device 400 and in particular to front panel 440. Components of enclosure door may include a door glass insert 408, a door latch (not shown), lift off hinges 412, 418, and door labels (not shown). Enclosure door 404 serves to protect the triggering mechanism of front panel 440 from accidental activation by unauthorized users under normal circumstances. In an embodiment, the door glass insert 418 may allow any user to break the glass and access the activation buttons in an emergency. In some embodiments, the door glass insert 408 may instead be a breakable safety glass panel 406. Door glass insert 418 may be transparent to allow viewing of the front panel 440 but yet shield from accidental activation.

Figure 9:
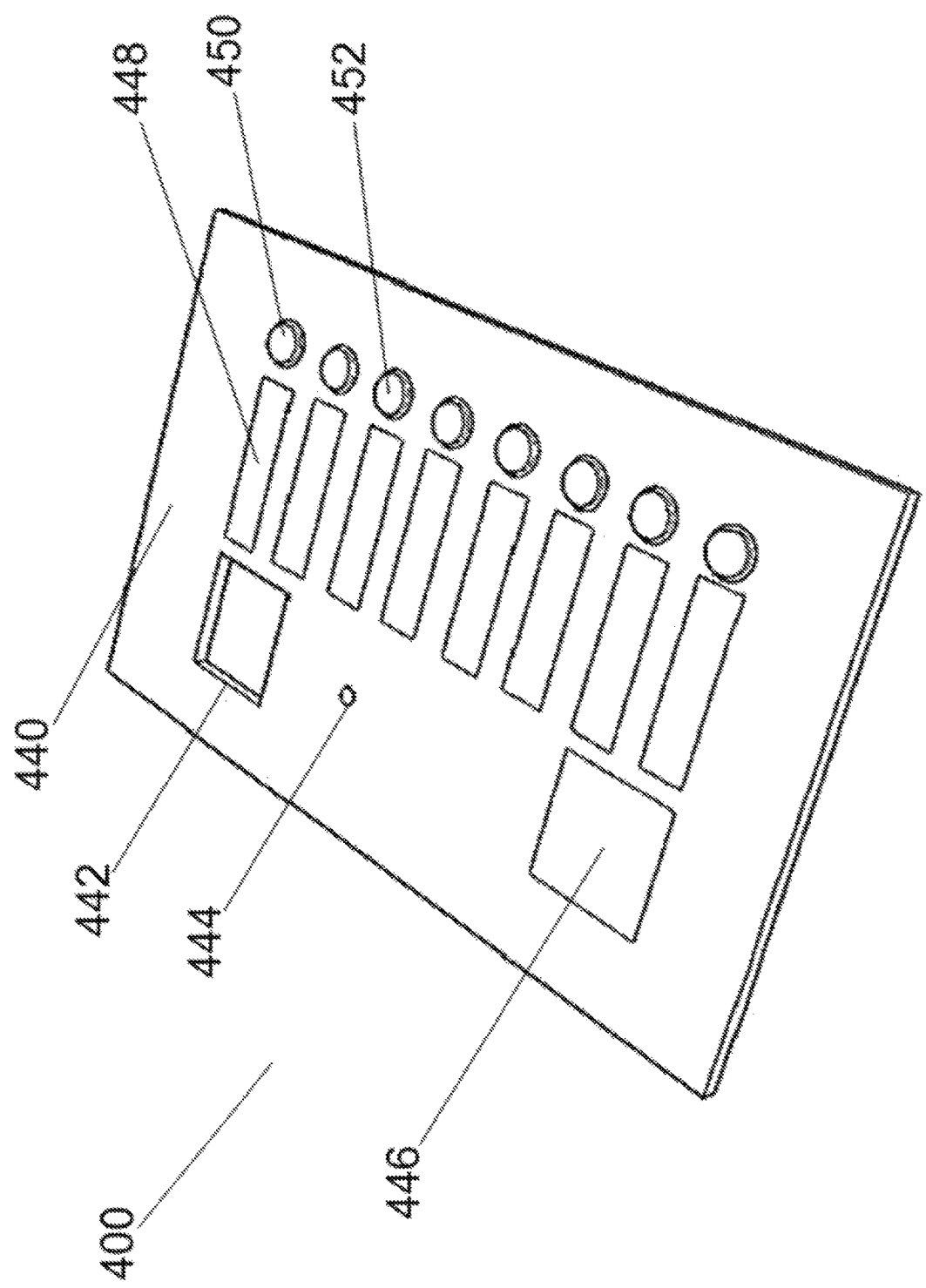
FIG. 9 is a perspective view of a front button insert panel for an activation premises device, according to the embodiment of FIG. 6.

As seen in FIG. 9, front panel 440 includes various input and display components that provide a mechanism for triggering alerts. The triggering mechanism (also herein called event trigger controls) is configured to accept user input and trigger notification of event personnel. In an embodiment, the triggering mechanism includes various input buttons, two of which are shown at 450, 452. Labels 448 associate each of the buttons with given emergency conditions or other events. In an embodiment, buttons 450, 452 are moveable buttons that project above the surface of front panel 440. However, in lieu of buttons the triggering mechanism may include any suitable input mechanism capable of making an electrical contact closure in an electrical circuit, or breaking an electrical circuit, or changing the resistance or capacitance of an electrical circuit, or causing other state change of an electrical circuit or an electronic routine. In various embodiments, the buttons would be replaced by an alternative input mechanism (not illustrated), such as a touch screen, touch screen buttons, holographic button, voice activated device, a sensor (e.g., a biometric sensor, accelerometer, or wind speed sensor), an audio trigger, a relay input trigger, or an electronic communications trigger, among other possibilities, including combinations of such input mechanisms. In an embodiment, the triggering mechanism may be configured for greater reliability, such as by training a voice activated device to recognize a particular voice. In an embodiment, the activation premises device includes component(s) such as supervisory resistors (not shown) that function to monitor the integrity of connectivity to buttons 448, 450. In an embodiment, the triggering mechanism may be activated by a security mechanism of activation premises device 400 that authenticates authorized users.

Other components of front panel 440 include a display 442 and a digital camera 444. In various embodiments, the activation premises device 400 includes a display device that is configured to display information and to accept user interaction. Exemplary displays include LCD displays, LED displays, and OLED displays. In an exemplary embodiment, the display device includes a touch screen. As shown in FIG. 9, a touch screen 442 is a small area display, but in many embodiments the touch screen could be significantly larger. A touch screen display may provide various functions. The touch screen display may show the status of given emergency conditions or other events. The touch screen display may show messages to and from the activation premises device 400. Message types may include for example messages regarding particular emergency conditions or other events, maintenance messages, and marketing messages. Additionally, the touch screen display may be configured to support polling and data collection services. The touch screen display may be configured for interaction with a technician (e.g., providing maintenance messages), for interaction with an authorized user, and for interaction with a passerby.

The digital camera 444 on front panel 440 may provide various functions. In an embodiment, digital camera 444 is configured to capture an image of the person activating the activation premises device 400 and to capture an image of the local environment when triggered. In an embodiment, digital camera 444 functions to support video conferencing capabilities of the activation premises device 400, for example during a conference call among emergency managers. Further, digital camera 440 may support security functions such as biometric sensing (e.g., facial recognition) to authenticate authorized users of activation premises device 400. Other types of sensors also may effect these various functions.

The enclosure opening side 420 of enclosure 402 includes an access control device 425. In an embodiment, access control device 425 operates under electrical control identify authorized users as a prerequisite for providing access to the enclosure 402. If user access is authorized, access control device 425 releases door latch 514 (FIG. 11; triggered by access control 520 via relay 512) to open the enclosure door 404. In another embodiment, access control device unlocks the door lock 486 of FIG. 10 to open the enclosure door 404. In an embodiment, the access control device 425 is a module that is accessible within an access control device aperture 424 on the enclosure opening side 420, and that electrically communicates with main board 460. (Access control device 425 is partially visible through the access control device aperture 424 in FIG. 7). A user actuates access control device 425 user by engaging an input element (not shown) of the device within the access control device aperture 424. The input element may be engaged manually (e.g., contacting a button control) or by other means such as a card reader. The enclosure 402 also may include an emergency access hole 427, which allows mechanical entry into the enclosure 402 if the access control device 425 fails. In an embodiment, a user inserts a pin or other tool (not shown) into the emergency access hole 427 to engage a mechanism that provides access into the enclosure 402. Access via access control device 425 serves as an authorized access module, wherein access via breaking the door glass insert 418 (FIG. 6) or access via mechanical entry into the enclosure 402 serves as an emergency access control device.

Figure 10:
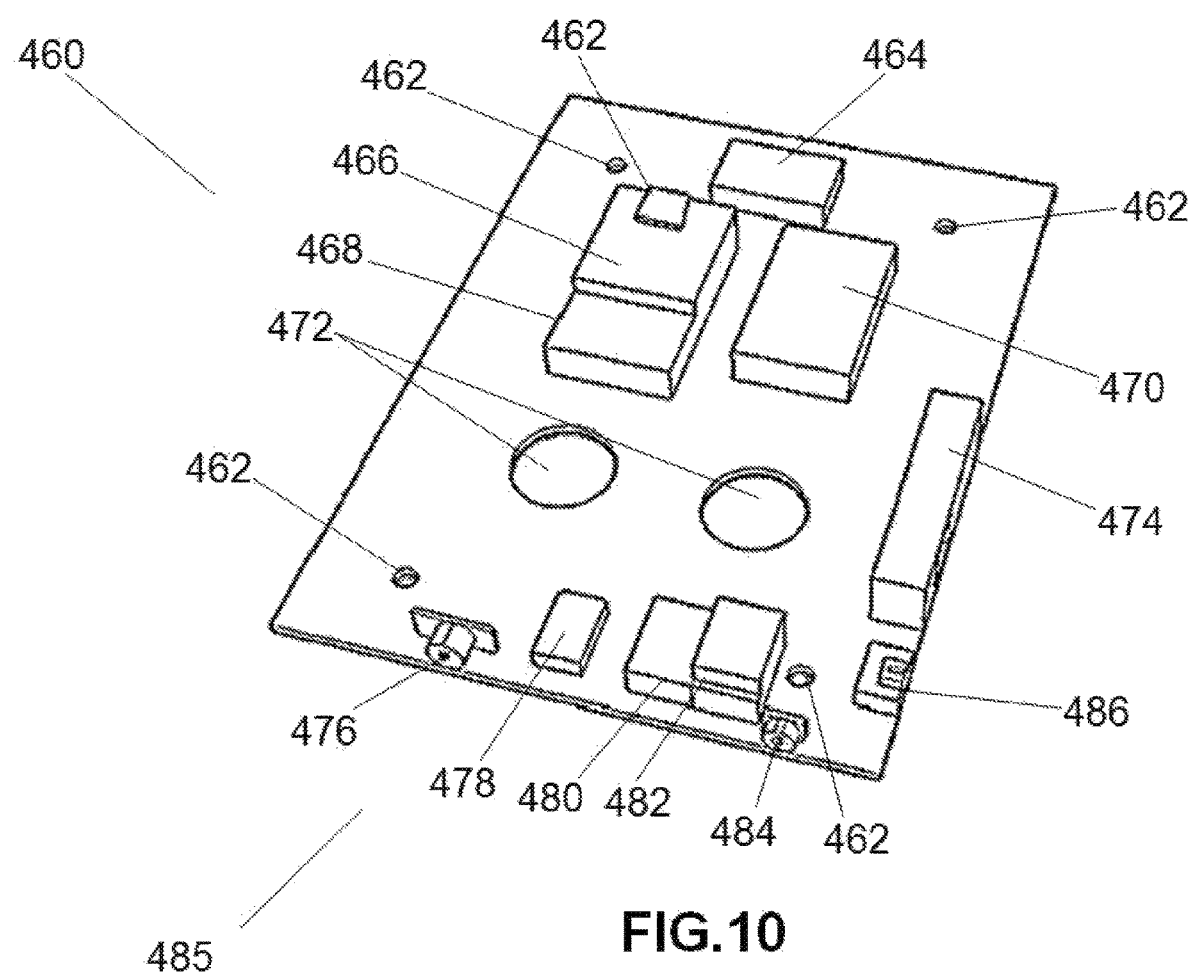
FIG. 10 is a perspective view of a mainboard of an activation premises device, according to an embodiment.

In an embodiment, access to enclosure 402 is controlled via one or more authorization sensors that cooperate with the access control device 425. In an embodiment, one or more authorization sensors 474 are housed on main board 460 (FIG. 10). In various embodiments, authorization sensors 474 may be biometric sensors, proximity sensors, or near field communication devices. In an embodiment, access control device 425 operably communicates with EMNS activation service 110, which may command release of the enclosure door 404 remotely. Additionally, access control device 425 may have other functions, including registering authorized users for access to activation premises device 400, and maintaining a log of users who seek access to enclosure 402.

The enclosure back surface 430 (FIG. 8) of enclosure 402 includes mounting holes 422 and a wire aperture 426. The mounting holes 422 may be used in mounting the enclosure 402 to a wall or other appropriate surface with fasteners (not shown). The wire aperture 426 provides an entry point for passage into enclosure 402 of wiring (not shown), such as wiring that conducts communication signals, control signals, power or other electrical current.

Figure 11:
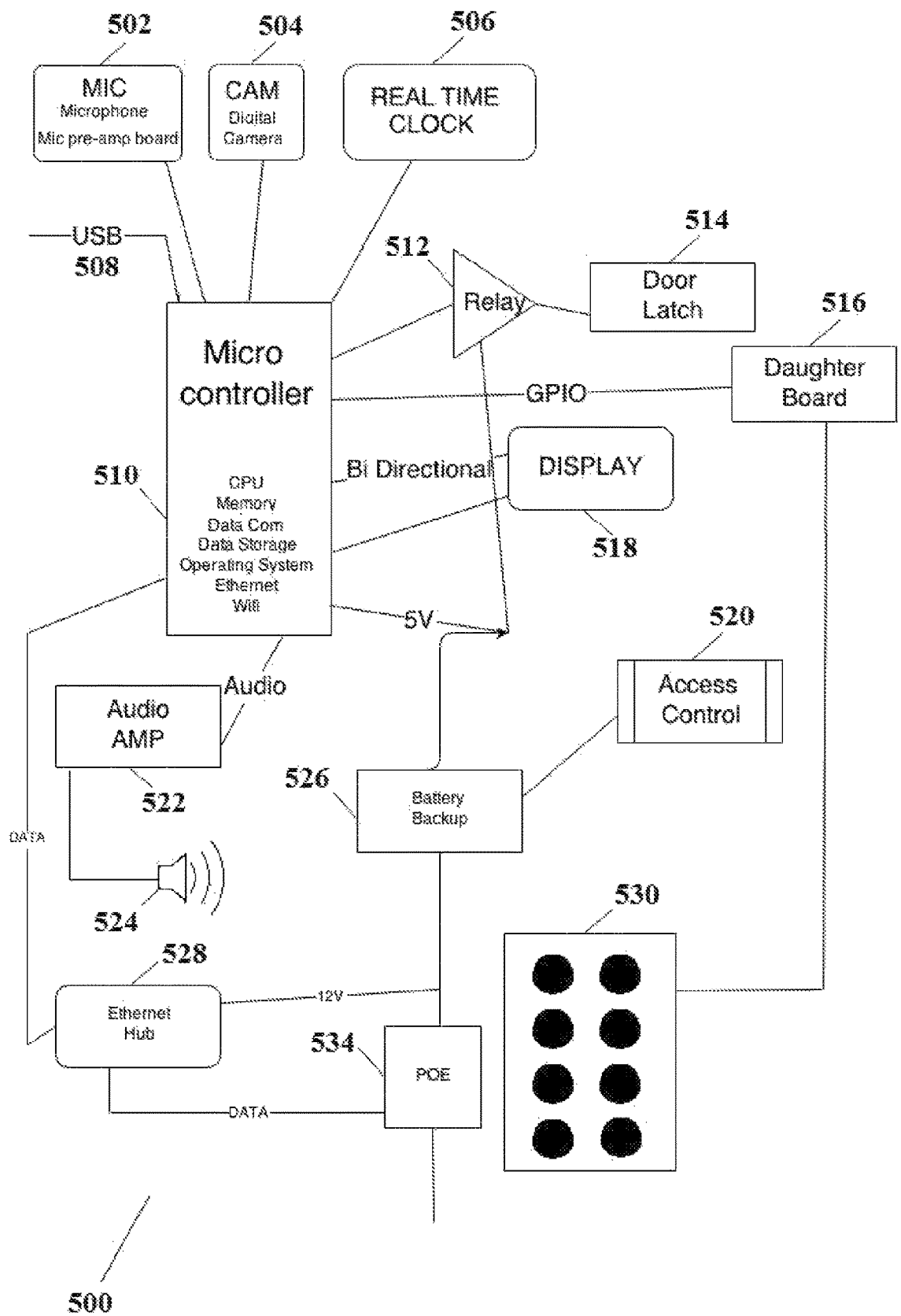
FIG. 11 is a schematic diagram of functional and control components of an activation premises device, according to an embodiment.

In the exemplary embodiment of in FIG. 10, various power elements, control elements, and other functional elements within the enclosure 402 may be housed on a main board 460. The illustrated embodiment includes one board or backplane 460. In alternative embodiments, multiple boards may be used. FIG. 11 illustrates in a circuit schematic diagram an alternate functional assembly 500 of power elements, control elements, and other functional elements, including a mother board with microcontroller 510, and a daughter board 516 with GPIO (General Purpose Input/Output) connection.

Main board 460 houses a CPU 468. As shown in the embodiment of FIG. 11, the CPU 510 may include a real time clock 506. In alternative embodiments, the real time clock may be omitted from CPU 468, and the board 460 may rely on data calls back to the event server 120.

The main board 460 houses power components, including power supply 464. The illustrated power supply 464 is a power over Ethernet device. In some embodiments, power supply 464 may include a direct power connection to an additional power source (not shown) such as a solar power device, a battery, a hydrogen fuel cell, or an alcohol fuel cell. The power system also includes a backup power supply 470, and may include power sensing circuitry. In the functional assembly 500 of FIG. 11, power elements include Power over Ethernet (POE) 534 providing a 12V power source, and backup battery 526 providing a 5V power source.

The main board 460 houses memory components, also herein called "memory" and "computer-readable storage medium". As used herein the term "memory" may include physical devices used to store programs (sequences of instructions) or data (e.g., program state information) on a temporary or permanent basis for use in a computer or other digital electronic device. In the illustrated embodiment, memory components include onboard memory 466 and removable memory 462. In an embodiment, the memory provides permanent storage of a trigger event application and an interface application. Additionally, the memory contains an operating system for activation premises device 400. In an embodiment, the operating system includes a collection of software programs that manage computer hardware resources and provide common services for computer programs of activation premises device 400.

Functional elements of the activation premises device 400 also may include communications circuitry, as shown in FIG. 11. In an embodiment, a data communication system functions both to maintain a communication link between activation premises device 400 and other devices of EMNS activation service 110, and to send and receive data to and from the event server 120. In the embodiment of FIG. 11, the data communication system includes an Ethernet Hub 528. Additionally or alternatively, the data communication system may include other communications technologies such as physical, fiber, optical or wireless interfaces. In some embodiments the data communication system may include backup communications circuitry (not shown) that is operable in the event that primary communications fail, which similarly could include Ethernet, physical, fiber, optical or wireless interfaces. The backup system serves to maintain a communication link between activation premises device 400 and other devices in the event the primary data communication system is disabled, and to communicate data to and from the event server 120 in the event the primary data communication system is disabled.

Other components housed on main board 460 include elements of an audio communication system 485, which provides one mode of communication of messages from the EMNS activation service 110. Enclosure 402 includes perforated portions for passing audio inputs and outputs to the audio communication system 485, including microphone perforations 414 and speaker perforations 416. In the illustrated embodiment, audio communication system 485 includes speaker 476, audio output amplifier circuit board 480, noise cancellation circuitry 478, microphone 484, and microphone preamplifier board 482. Noise cancellation circuitry 478 cooperates with microphone preamplifier board 482 to modify the signal received by the microphone 484 to adjust for more intelligible audio quality and appropriate decibel levels. In some embodiments, the audio output amplifier circuit board 480 may be omitted and an amplifier may be included on a CPU board. In other embodiments, there is no audio communication system, and the EMNS activation service 110 may ring a local phone to communicate information to a customer or event personnel devices 190. In the alternate functional assembly 500 of FIG. 11, elements of an audio communication system include audio amp 522 that receives audio outputs from microcontroller 510, speaker 534, and microphone with associated microphone pre-amp board 502.

Additionally, functional elements of the activation premises device 400 may include a button control interface, as shown at 530 in FIG. 11. Button control interface 530 provides event trigger controls including buttons 450, 452 on front panel 460. Button control interface may include a digital input-output interface circuit board, or alternatively may include an analog-to-digital circuit board that processes analog signals from buttons 450, 452.

Functional elements of the activation premises device 400 also may include a display with associated display interface board, as shown at 518 in FIG. 11. The display interface board may control display of information on a display screen, and in certain embodiments, may control inputs received from a user-interactive display screen such as a touch screen (e.g., touch screen 442). Additionally, the assembly 500 of FIG. 11 includes at 504 a control interface for digital camera 444.

Main board 460 may be mounted within the enclosure 402 using mounting holes 462 and fasteners (not shown). For example, main board may be mounted at the interior of the rear surface 430 of enclosure 402. Main board 460 may incorporate appropriate electrical conductors, such as wire apertures 472 that may provide access points for wiring, e.g., wiring passing through wire apertures 472 and through wire aperture 426 at the rear surface 430 of enclosure 402. Main board 460 also houses a door lock 486.

Referring again to FIG. 1, EMNS activation service 110 includes an event server 120 and a web application server 150. These servers may take the form of one or more cloud-based servers and each cloud-based server may include a data storage system 145 that may store various data as described below. Cloud-based servers may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

In the exemplary embodiment, the event server 120 and web application server 150 are housed within a high reliability, high availability data center. An exemplary data center or computer room (sometimes called a server farm) is a facility or room used to house computer systems and associated components for companies and organizations. The facility may include environmental controls (air conditioning, fire suppression, etc.), redundant/backup power supplies, and redundant data communications connections.

The event server 120 acts as the communication relay between activation premises devices 160 of communications sent or received via communication network 103; and EMNS providers 180 (such as EMNS providers EMNS-1, EMNS-2, and EMNS-3) and event personnel devices 190, of communications sent or received via communication network 105

In an embodiment, the event server 120 is comprised of two sub-components, a universal translator 130 (also herein called universal translator module) and a communication protocol module 140. As used in the present disclosure, the term "universal translator" refers to a program that receives event triggers 115 (also herein called triggered events, or event trigger signals) from the activation premises device 160 and converts the event trigger signals 115 to one or more EMNS communication protocol 185. In an embodiment, customer triggering device 160 is configured to provide event trigger signals in a predefined format recognized by universal translator 130. Universal Translator 130 notifies one or more EMNS provider 180 and also may relay data to one or more activation premises device 160 and/or to event personnel devices 190. The communication protocol module 140 includes operational instructions to communicate over a communication network 105 using a specific required protocol. In some embodiments, the communication protocol module 140 may use any of the following communication protocols, among others: TCP-IP (Transmission Control Protocol/Internet Protocol); UDP (User Datagram Protocol); VoIP (Voice over IP); SIP (Session Initiation Protocol); Telnet; SSH (Secure Shell protocol), CAP (Common Alerting Protocol), HTTP (Hypertext Transfer Protocol), SMTP (Simple Mail Transfer Protocol), or SNMP (Simple Network Management Protocol).

Universal translator 130 performs various functions. The universal translator 130 is configured to provide information concerning triggered events for communications by EMNS activation service 110 with the activation premises device 160. Additionally, the universal translator 130 is configured to provide information concerning triggered events for communications by EMNS activation service 110 with EMNS providers 180 via event-specific EMNS protocols 185. Additionally, the universal translator 130 is configured to provide information concerning triggered events from EMNS activation service 110 intended for the event personnel devices 190, via notification communications by EMNS providers 180. The universal translator 130 is configured to provide event data, among other information; the present disclosure uses event data to describe information relating to an event that is based upon event trigger signal(s) received by EMNS activation service 110 from an activation premises device 160.

In an embodiment, an EMNS protocol provided by the universal translator 130 for communication with a specific EMNS provider 180 is particular to the requirements of that EMNS provider 180. As used in the present disclosure, an EMNS protocol 185 is a communication protocol that is required by EMNS provider 180 in order to trigger a mass notification; and an event-specific EMNS protocol is an EMNS protocol specific to one or more of a plurality of categories of emergency events and/or descriptions of emergency events, wherein the category of emergency event and/or description of emergency events is identified an event trigger signal.

Universal translator 130 stores data and applications used in effecting its various functions. In an embodiment, the universal translator 130 is configured to store a list 132 of event personnel. In an embodiment, the universal translator 130 is configured to store a chain of command list 134 that is event-specific. In an embodiment, the universal translator 130 is configured to store one or more applications 136 for translation of event trigger signals to event-specific EMNS protocols 148. In an embodiment, the universal translator 130 is configured to store one or more required emergency reports 138. In an embodiment, the universal translator 130 is configured to store one or more event related procedures 139. In an embodiment, the universal translator 130 is configured to store one or more lists 142 of event personnel devices 190 that have been designated to receive event-specific required emergency reports 144.

As used in the present disclosure, event-specific event related procedures are event related procedures specific to one or more of a plurality of categories of emergency events and/or descriptions of emergency events, wherein the category of emergency event and/or description of emergency events is identified an event trigger signal. As used in the present disclosure, event-specific emergency reports are emergency reports specific to one or more of a plurality of categories of emergency events and/or descriptions of emergency events, wherein the category of emergency event and/or description of emergency events is identified an event trigger signal.

In various embodiments, EMNS activation service 110 includes a data storage system 145. In an embodiment, data storage system 145 is configured to store a list of event personnel 132; to store a chain of command list 134 that is event-specific; to store one or more EMNS event-specific protocol translation applications 136; to store one or more required emergency reports 138; to store one or more event related procedures 139; and to store one or more lists 143 of event personnel devices 190 that are to receive event-specific required emergency reports 144.

In various embodiments, universal translator 130 is configured with executable instructions for effecting various functions of the EMNS activation service 110. These executable instructions may include instructions for network communication with one or more event personnel devices 190; one or more activation premises device 160; and one or more EMNS provider 180. Additionally, these executable instructions may include instructions for network monitoring of one or more activation premises device connectivity and integrity; instructions for one or more EMNS protocol translation applications 136, and instructions for network software update of the activation premises device 160.

In another embodiment, as an alternative to housing the universal translator 130 on the event server 120, universal translator 130 is implemented as a cloud-based service.

Operating in conjunction with other systems of EMNS activation service 110, web application server 150 allows customers to interact and manage the EMNS activation service 110. In an embodiment, web application server 150 provides a web-accessible graphical user interface (GUI) service for management of settings for the EMNS activation service 110. This GUI allows users to interact with electronic devices through graphical icons and visual indicators such as secondary notation.

Web application server 150 provides a suite of graphical user interface services (Management Services 155) that may include some or all of the following services: (1) a GUI for configuring authorized users that enables users to manage authorized users of the activation premises device 160 and/or EMNS activation service 110; (2) an event protocol management GUI that enables users to manage EMNS protocol configurations and settings; (3) a chain of command management GUI that enables users to manage the chain of command for notification of event personnel devices 190; (4) an event-specific report management GUI that enables users to manage event-specific reports that are necessary for completion in the case of an event; (5) a testing procedures management GUI that enables users to manage event related procedures that are to be followed in the case of an event; (6) a training graphical user interface GUI that enables users to evaluate training materials related to the use of the EMNS activation service 110; (7) an account management GUI that enables users to manage location and communication details of the users of the activation premises device 160 and/or EMNS activation service 110; (8) a billing management GUI that enables users to manage payments for the EMNS activation service 110; (9) an event map GUI that shows real time maps of areas in which events occur; and (10) a help GUI that for system users.

In addition to Management Services 155, web application server 150 may initiate and manage conference calls among emergency managers via Conferencing Services 157. In one embodiment, the Conferencing Services module 157 may be configured as a PBX system to initiate a telephone conference among emergency managers. Conferencing Services 157 may use various communication protocols, such as VOIP (Voice over IP). In one embodiment, Conferencing Services module 157 initiates a conference call among emergency managers using a reverse PBX protocol in which all telephones of participating emergency managers receive the call at the same time. In another embodiment, one of the emergency managers initiates a conference call, e.g., via an event personnel device 190, and Conferencing Services module 157 relays the collaboration call to other participating emergency managers.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then", "next", etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disk (CD), laser disc, optical disk, digital versatile disk (DVD), floppy disk, and Blu-ray disk where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. An activation premises device comprising:
    a housing comprising an enclosure and an enclosure door;
    a processor contained within the enclosure;
    an insert panel contained within the enclosure,
        wherein the insert panel includes a plurality of input mechanisms communicatively coupled to the processor,
        wherein the input mechanisms are selected from the group consisting of moveable buttons, push buttons, a touch screen, touch screen buttons, and holographic buttons,
        wherein each of the plurality of input mechanisms communicatively coupled to the processor is configured to cause a respective state change of the processor in response to user actuation of the respective input mechanism,
        wherein the respective state changes of the processor include an instruction to send an event trigger signal, the event trigger signal relating to an emergency event, and
        wherein the enclosure door is locked and the insert panel and the plurality of input mechanisms are inaccessible to the user within the enclosure in the absence of actuation of an authorized access module;
    a communication module communicatively coupled to the processor and a communication network and configured for communicating the event trigger signal to an emergency mass notification system (EMNS) activation service over the communication network, wherein the event trigger signal is in a predefined format; and
    the authorized access module for unlocking the enclosure door to provide authorized access to the insert panel and the plurality of input mechanisms, wherein the authorized access module comprises one or more of a card reader, a biometric sensor, a proximity sensor, and a near field communication device.

2. The activation premises device of claim 1, further comprising an emergency access control device associated with the enclosure door for providing emergency access to the insert panel and the plurality of input mechanisms.

3. The activation premises device of claim 2, wherein the emergency access control device comprises one or more of a breakable glass panel of the enclosure door and a mechanically actuated device for releasing a latch of the enclosure door.

4. The activation premises device of claim 1, further comprising a digital camera, wherein the digital camera in operative communication with the processor is configured to capture an image of a local environment of the activation premises device in response to the user actuation of one of the plurality of input mechanisms.

5. The activation premises device of claim 1, wherein the respective state changes of the processor further include an instruction to initiate an emergency teleconference relating to the emergency event, and wherein the communication module is configured for communicating to the EMNS activation service the instruction to initiate an emergency teleconference relating to the emergency event.

6. The activation premises device of claim 5, further comprising a digital camera, wherein the digital camera in operative communication with the processor is configured to support video conferencing capabilities of the activation premises device during the emergency teleconference relating to the emergency event.

7. The activation premises device of claim 1, wherein the respective state changes of the processor further include an instruction to acquire and record local environmental information and an instruction to communicate the local environmental information to the EMNS activation service via the communication module when communicating the event trigger signal to the EMNS activation service.

8. The activation premises device of claim 1, wherein the respective state changes of the processor further include an instruction, upon receipt via the communication module of a reinitiation command from the EMNS activation service, to cause the activation premises device to play or display a prompt to reinitiate the event trigger signal.

9. The activation premises device of claim 1, wherein the plurality of input mechanisms include a push button interface with a series of movable activation buttons.

10. The activation premises device of claim 1, wherein the insert panel includes a user-interactive display screen.

11. The activation premises device of claim 10, wherein the plurality of input mechanisms include a touch screen of the user-interactive display screen within the enclosure.

12. An activation premises device comprising:
    a housing comprising an enclosure and an enclosure door;
    a processor contained within the enclosure;
    an insert panel contained within the enclosure,
        wherein the insert panel includes a plurality of input mechanisms communicatively coupled to the processor,
        wherein the input mechanisms are selected from the group consisting of moveable buttons, push buttons, a touch screen, touch screen buttons, and holographic buttons,
        wherein each of the plurality of input mechanisms communicatively coupled to the processor is configured to cause a respective state change of the processor in response to user actuation of the respective input mechanism,
        wherein the respective state changes of the processor include an instruction to send an event trigger signal, the event trigger signal relating to an emergency event, and
        wherein the enclosure door is locked and the insert panel and the plurality of input mechanisms are inaccessible to the user within the enclosure in the absence of actuation of an authorized access module;
    a communication module communicatively coupled to the processor and a communication network and configured for communicating the event trigger signal to an emergency mass notification system (EMNS) activation service over the communication network, wherein the event trigger signal is in a predefined format; and the authorized access module configured for unlocking the enclosure door to provide authorized access to the insert panel and the plurality of input mechanisms, wherein the authorized access module comprises one or more of a card reader, a biometric sensor, a proximity sensor, and a near field communication device, and wherein the insert panel includes a user-interactive display screen, wherein the plurality of input mechanisms include a touch screen of the user-interactive display screen within the enclosure.

13. The activation premises device of claim 12, further comprising an emergency access control device associated with the enclosure door for providing emergency access to the insert panel and the plurality of input mechanisms.

14. The activation premises device of claim 13, wherein the emergency access control device comprises one or more of a breakable glass panel of the enclosure door and a mechanically actuated device for releasing a latch of the enclosure door.

15. The activation premises device of claim 12, further comprising a digital camera, wherein the digital camera in operative communication with the processor is configured to capture an image of a local environment of the activation premises device in response to the user actuation of one of the plurality of input mechanisms.

16. The activation premises device of claim 12, wherein the respective state changes of the processor further include an instruction to initiate an emergency teleconference relating to the emergency event, and wherein the communication module is configured for communicating to the EMNS activation service the instruction to initiate an emergency teleconference relating to the emergency event.

17. The activation premises device of claim 16, further comprising a digital camera, wherein the digital camera in operative communication with the processor is configured to support video conferencing capabilities of the activation premises device during the emergency teleconference relating to the emergency event.

18. The activation premises device of claim 12, wherein the respective state changes of the processor further include an instruction to acquire and record local environmental information and an instruction to communicate the local environmental information to the EMNS activation service via the communication module when communicating the event trigger signal to the EMNS activation service.

19. The activation premises device of claim 12, wherein the respective state changes of the processor further include an instruction, upon receipt via the communication module of a reinitiation command from the EMNS activation service, to cause the activation premises device to play or display a prompt to reinitiate the event trigger signal.

* * * * *